US006385737B1

(12) United States Patent
Benignus et al.

(10) Patent No.: US 6,385,737 B1
(45) Date of Patent: May 7, 2002

(54) ELECTRONIC KEY FOR A DATA PROCESSING SYSTEM

(75) Inventors: Douglas Marvin Benignus; Kanti Champaklal Shah, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1405 days.

(21) Appl. No.: 08/641,629

(22) Filed: May 2, 1996

Related U.S. Application Data

(63) Continuation of application No. 08/330,466, filed on Oct. 28, 1994, now abandoned.

(51) Int. Cl.[7] .................................................. G06F 11/00
(52) U.S. Cl. ........................................... 714/22; 714/46
(58) Field of Search ..................... 379/95; 395/183.22, 395/185.1; 714/22, 25, 39, 46, 47

(56) References Cited

U.S. PATENT DOCUMENTS

| | | | |
|---|---|---|---|
| 4,685,124 A | | 8/1987 | Smitt et al. |
| 4,962,449 A | * | 10/1990 | Schlesinger ................. 395/186 |
| 5,084,875 A | * | 1/1992 | Weinberger et al. ... 395/183.22 |
| 5,101,373 A | * | 3/1992 | Tanioka et al. ............. 395/186 |
| 5,276,863 A | | 1/1994 | Heider |
| 5,377,269 A | * | 12/1994 | Heptig et al. ................. 380/25 |
| 5,388,211 A | * | 2/1995 | Hornbuckle ................. 395/700 |
| 5,402,492 A | * | 3/1995 | Goodman et al. ............ 380/25 |
| 5,508,691 A | * | 4/1996 | Castleman et al. .... 340/825.31 |

FOREIGN PATENT DOCUMENTS

| | | |
|---|---|---|
| JP | 3235154 | 10/1991 |

OTHER PUBLICATIONS

IBM Technical Disclosure Bulletin, vol. 35, No. 7, Dec. 1992, "Remote Service—Switchable Electronic Customer Support Communications Line", pp. 457–458.
Remote Service: Switchable Electronic Customer Support Communcations,*IBM Technical Disclosure Bulletin*, No. 7, Dec. 1992, pp. 457–458.
Remote Console Function Using a Hardware Adapter, *IBM Technical Disclosure Bulletin*, Nov. 1974, pp. 1650–1651.

* cited by examiner

*Primary Examiner*—Nadeem Iqbal
(74) *Attorney, Agent, or Firm*—Mark S. Walker; Volel Emile; Leslie A. Van Leeuwen

(57) ABSTRACT

A data processing system is provided with an electronic key for remote designation of the computer system into a service, secure, or normal/run mode of operation. Such a remote designation is enabled when a physical or manual key is set to a normal/run mode of operation. Setting of the electronic key to a service mode permits remote access to the system for maintenance or debug operations.

11 Claims, 2 Drawing Sheets

| PHYSICAL KEY | ELECTRONIC KEY | SYSTEM STATUS |
|---|---|---|
| SECURE | X | SECURE |
| SERVICE | X | SERVICE |
| NORMAL OR RUN | NORMAL OR RUN | NORMAL OR RUN |
| NORMAL OR RUN | SERVICE | SERVICE |
| NORMAL OR RUN | SECURE | SECURE |

FIG. 2

ELECTRONIC KEY FOR A DATA PROCESSING SYSTEM

This application is a continuation of application Ser. No. 08/330,466, filed on Oct. 28, 1994, which was abandoned upon the filing hereof.

TECHNICAL FIELD OF THE INVENTION

The present invention relates in general to data processing systems, and in particular, to an implementation of an electronic key within a data processing system.

BACKGROUND OF THE INVENTION

Computer systems often contain valuable and sensitive information stored within their memories and bulk storage devices. Security and data integrity for computer systems is a continual concern within such systems.

It is very common for a physical key to be located somewhere on a computer, which allows one to "lock" the computer from intrusions, physically and/or logically, from third parties. These physical keys may work in one of two ways. A physical key may actually lock up a physical cover to the computer components, or a key may lock up access to the computer's power.

Furthermore, data processing systems are often prone to malfunctions either in hardware or software. The problem with such malfunctions is that the user is often placed at a severe disadvantage should their computer system go down. Additionally, users and owners of computer systems are often not capable of repairing either the hardware or the software within their computer system and thus require assistance from the computer maker or some other provider of computer-related repair services. The immediate solution is for the computer owner to contact a service provider, who will then physically travel to the location where the computer resides to make necessary repairs. This results in a considerable amount of down time, possibly paralyzing the user's business.

A better solution would be for the repairs to be made remotely via a telecommunications connection, or for the service provider to instruct, over the phone, the user as to how to implement repairs in either hardware or software. Naturally, many repairs necessitate that the service provider actually perform the repairs, since even a great amount of "coaching" will not enable a non-technical user to make effective repairs.

An added problem to the foregoing is that many computer systems require the user to manually place the computer system into a servicing mode so that a remote service provider may make repairs. When such repairs are completed, it is then necessary for the user to manually return the computer system to a normal operational mode.

There are two problems with the above. First, the user may forget to return the computer system to a normal operational mode. Second, the computer system may be located in an inaccessible location, such as a chemically or nuclear hazardous environment, thus making it impossible for a user to physically switch the computer system into a service mode and then return it to a normal operational mode.

As a result of the foregoing, there is a need in the art for a technique for remotely placing the computer system into a service mode and then returning it to a normal operational mode. There is also a need in the art for a technique for placing a computer system into a secure mode, preventing access by unauthorized users.

SUMMARY OF THE INVENTION

Thus, it is a primary objective of the present invention to provide an electronic key which is operable to place a data processing system within a normal/run, service, or secure mode from a remote location. In an attainment of this objective, the present invention provides a means for remotely placing a data processing system within a normal operational mode, a service mode, or a secure mode through an input/output port within the data processing system.

In a preferred embodiment of the present invention, such a switchability of modes is enabled when a physical key resident within the chassis of the computer system is placed within a normal operational mode. When the physical key is placed in a secure or service mode, then the electronic key is essentially deactivated.

An advantage of the present invention is that it permits system maintenance and diagnosis of problems in a data processing system under a controlled, well-defined service mode environment, utilizing built-in diagnostic features. Service calls can then be reduced, mean-time to repair can be improved, thereby increasing the system availability and up time.

Another advantage of the present invention is that it does not require a physical presence at the site where the data processing system is located in order to place the data processing system into a service mode.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 2 illustrates a truth table in accordance with the present invention.

DETAILED DESCRIPTION OF A PREFERRED EMBODIMENT OF THE INVENTION

Figure 1:
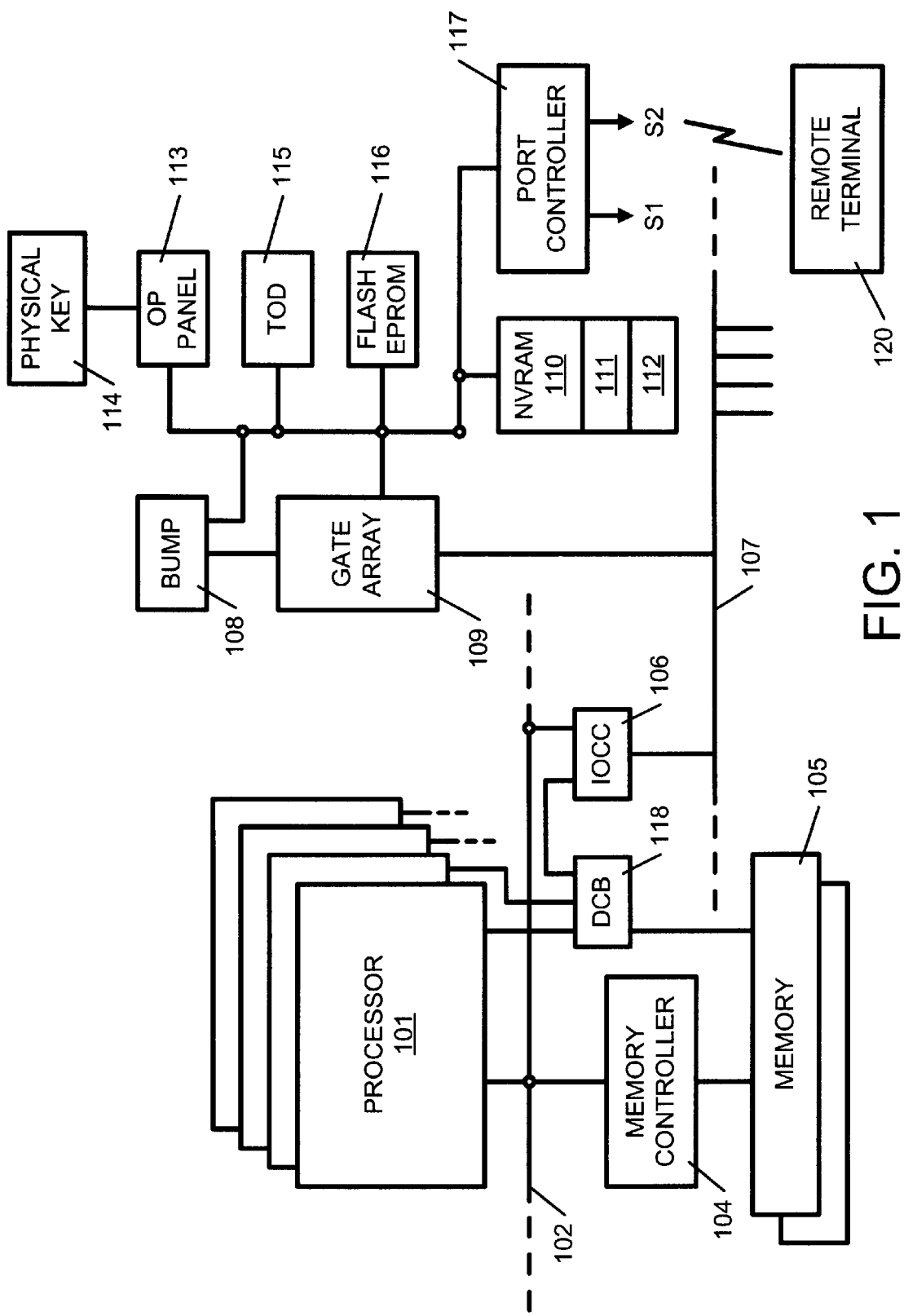
FIG. 1 illustrates a data processing system in accordance with a preferred embodiment of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Referring to FIG. 1, there is illustrated data processing system 100 for implementing a preferred embodiment of the present invention. Data processing system 100 may be a uniprocessor or multiprocessor system, such as a symmetrical multiprocessor system. From a RAS (reliability, availability and serviceability) point of view, it is desired that system 100 should be designed to be maintained and serviced from a remote location, both in an off-line mode and an on-line mode, wherein the operating system is up and running (an example operating system is the AIX operating system commercially available from IBM Corp.). A remote location is any site, connected via a modem, such as a customer administrative center (customer hub) or a service center. It is desired that problems with system 100 be isolated to an FRU/CRU level remotely. In other words, it is desired to be able to remotely determine whether or not a fault is in a field replaceable unit (FRU), wherein a visit is required from a service representative or the fault is in a customer replaceable unit (CRU), wherein a customer may be "coached" over the telephone to replace a damaged unit.

Processor(s) 101 is coupled to address bus 102, which is coupled through memory controller 104 to memory 105. Processor(s) 101 is also coupled to data crossbar 118 via data bus 103. Data crossbar 118 is also coupled to memory 105 and is coupled to input/output channel controller ("IOCC") 106, which is coupled to microchannel bus 107.

For a further discussion of the foregoing portion of system 100, please refer to the following applications for patent, assigned to a common assignee and co-pending:

EFFICIENT ADDRESS TRANSFER TECHNIQUE FOR A DATA PROCESSING SYSTEM, Ser. No. 08/317,007;

DUAL LATENCY STATUS AND COHERENCY REPORTING FOR A MULTIPROCESSING SYSTEM, Ser. No. 08/316,980;

SYSTEM AND METHOD FOR DETERMINING SOURCE OF DATA IN A SYSTEM WITH INTERVENING CACHES, Ser. No. 08/317,256;

QUEUED ARBITRATION MECHANISM FOR DATA PROCESSING SYSTEM, Ser. No. 08/138,869;

METHOD AND APPARATUS FOR REMOTE RETRY IN A DATA PROCESSING SYSTEM, Ser. No. 08/316,978;

ARRAY CLOCKING METHOD AND APPARATUS FOR INPUT/OUTPUT SUBSYSTEMS, Ser. No. 08/316,976;

DATA PROCESSING SYSTEM HAVING DEMAND BASED WRITE THROUGH CACHE WITH ENFORCED ORDERING, Ser. No. 08/316,979;

ALTERNATING DATA VALID CONTROL SIGNALS FOR HIGH PERFORMANCE DATA TRANSFER, Ser. No. 08/326,190;

LOW LATENCY ERROR REPORTING FOR HIGH PERFORMANCE BUS, Ser. No. 08/326,203;

Each of such referenced applications are hereby incorporated by reference as though fully set forth herein.

Bus 107 is coupled to gate array 109, which is coupled to BUMP (bring-up microprocessor) 108. BUMP is similar to the on-card sequencer ("OCS"), an 8-bit microcontroller utilized on current RISC 6000 systems, commercially available from IBM Corp. A major enhancement within BUMP is to provide a user interface which allows for additional problem determination features, remote maintenance, and remote operation via async tty (teletype or dumb) terminal 120, which may be coupled to port controller 117 via a modem (not shown). BUMP 108 monitors the progress and status of tests executed by processor 101. When BUMP is in control of system 100, it has control of the S1 and S2 ports coupled to asynchronous port controller 117, which is coupled to gate array 109 and BUMP 108. This mode is called the off-line mode. BUMP 108 will stay in control of system 100 until the boot record is loaded. At this time, BUMP 108 will release control of the S1 and S2 ports and turn control over to processor 101 and the operating system within NVRAM 110.

BUMP 108 and gate array 109 are also coupled to operational panel 113, time-of-day 115, flash EPROM 116 and nonvolatile random access memory ("NVRAM") 110. Operational panel 113 is coupled to physical key 114, while NVRAM 110 includes physical key register 111 and electronic key register 112. BUMP 108 may be a 16-bit microprocessor that provides an interface with an electronic key stored within NVRAM 110.

There are several flags implemented within BUMP that affect its operation. A maintenance contract flag may be set to "valid" in order for remote personnel from a service provider to have access to system 100. A remote authorization flag may be set in order to allow a remote connection to BUMP 108 through ports S1 and S2. A dial-out flag allows BUMP 108 to call out and report problems to a remote service center. A dial-in flag allows BUMP 108 to accept incoming calls through ports S1 and S2.

The present invention provides several features within system 100 in order to support remote maintenance/service. There are three modes of operation: secure, service, and normal/run. Within the secure mode, no standby or off-line maintenance menus may be presented while physical key 114 is in the secure mode. If the electronic key within NVRAM 110 is in a secure mode while physical key 114 is placed in a normal mode, then a stalled system status menu presented allows changing the electronic key. Also within the secure mode, local and remote off-line maintenance/service is disabled or not allowed, except for an ability to change the electronic key position. Other features remain the same as within the current RISC 6000 family of computer products.

Within a service mode, system 100 can IPL using the service boot list, or a boot device selected from the off-line maintenance menu.

Within a normal/run mode, (a) standby and/or off-line maintenance menus will not be presented; and (b) a key interface menu, which allows one to set the electronic key, is presented in the following circumstances:

(1) System 100 has physical key 114 in a normal/run mode, but the electronic key has been set within a secure position. In this case, after displaying a code "200" on an LCD display on system 100, BUMP firmware 108 should dial out (if the maintenance contract flag is valid, and the remote service authorization or dial out flags are set) and report these conditions. At this point, a stalled system menu may be presented on a local console coupled to system 100. After reporting the problem, the remote connection may be terminated.

(2) Both physical and electronic keys are in normal/run positions, and a failure is encountered while executing a built-in self test ("BIST"), power on self tests ("POST"), or quick confidence tests. A catastrophic hardware or software problem may have prevented system 100 from a successful IPL. Similarly, if the list of boot device is exhausted and no legitimate boot record is found, an IPL cannot succeed. As the tests are progressing, appropriate status or error code may be presented on the LCD display and a local/remote BUMP console. At the conclusion of the tests, BUMP 108 should dial out (if the maintenance contract flag is valid, and the remote service authorization and dial out flags are set) and report these conditions (test failure, boot record not found, or failing to boot). At this point, a key interface menu may be presented on the local console. After reporting the problem, the remote connection is terminated.

For both cases (a) and (b) above, if the remote authorization flag is set, BUMP 108 will enter a state where it waits to receive an incoming call. A customer hub or remote service center may now dial in. BUMP 108 may request that a valid password be entered. Upon receipt of a valid password, a key interface menu is presented on the remote console. The remote service center can now change the electronic key to a service mode. At this point, the remote calling party may disconnect itself or issue a system reset. Then, if the remote calling party has disconnected itself, anyone else can call in. Thus, a customer hub can set the electronic key to service and disconnect itself. BUMP 108 again enters into the "waiting for call receive" state. The remote service center can now be informed (via a voice phone) of a problem, and the remote service center can now call in and perform maintenance.

The present invention offers the following advantages:

(1) Both off-line and on-line maintenance are possible.

(2) Detected problems and/or boot failures are reported to a remote site, and then the connection is terminated.

(3) If a customer has only a few machines, each can be independently connected to the remote service center via the S2 port. If the remote authorization flag is authorized, the remote service center can then call back, connect to system 100 and perform service and/or maintenance. If not, the customer can be called and requested to set the dial-in flag.

(4) If a customer has a large number of machines that are maintained or administered remotely by a customer hub or administration center, each can be connected to the customer hub via the S1 port. The customer hub may then provide a remote BUMP console, wherein all problems and boot failures are reported. The customer hub can set the dial-in flag and place the machine in service via the electronic key. Then, the customer hub can call the remote service center and ask them to dial-in via the S2 port of the target system 100 to be serviced. In this case, the remote session can be mirrored on the S1 console of the target machine (located physically next to the machine, or connected remotely at the customer hub via a model). Now the mirror image of the remote session can be obtained on the AIX console of the customer hub machine under AIX control. Remote connection can be terminated by movement of a physical switched on the target machine, or by setting the remote authorization flag off. After the machine has been serviced, the remote system can disconnect, and inform the customer of action(s) taken or being taken.

Any and all transactions of physical key 114 are sensed by BUMP 108 on a real-time basis and recorded in NVRAM register 111. The operating system within system 100 is informed of the contents of register 111 via an interrupt. Any switching of physical key 114 will be immediately active without having to wait until the next IPL for the key position change to take an effect. However, once the operating system is up and running, BUMP 108 exercises no control over the operation or configuration of system 100; therefore, it is up to the operating system to note the key position changes, and to take appropriate action. BUMP 108 will merely notify the operating system. This notification is necessary, because the operating system may wish to terminate the remote session in progress upon sensing the change in the position of physical key 114. If system 100 were to shut down and re-IPL, the position of physical key 114 will definitely be effective and taken into account by BUMP 108.

NVRAM 110 also includes register 112 to store the electronic key status. BUMP 108 will check the position of both registers 111 and 112 in order to take appropriate action.

Once the operating system is up and running, since the console is under operating system control, the only human interface available is to the operating system via its command line. Therefore, through the operating system command line, the electronic key position can be changed by the user, but no command can be issued to BUMP 108 to change the key position.

Once the operating system is up and running, BUMP 108 can monitor or sense a change in the physical or electronic key position. When the operating system is up, it can write to register 112 at any time, and change the electronic key position. The operating system will, then, post a message in the mailbox for a BUMP-to-operating system interface, or send an interrupt to BUMP 108 in order to inform BUMP 108 of any operating system initiated key position change.

Since NVRAM 110 is memory mapped, the operating system can write to register 112 at any time. Thus, the electronic key within EPROM 116 is available to the operating system, irrespective of whether a local or remote BUMP console is available or not.

The following may be implemented in order for the operating system to handle the electronic key:

The electronic key is controlled by an operating system command.

The command may be 'key' or 'key-n' or 'key-s' or 'key-sc'.

'Key' gives/displays the status of both keys, e.g., the physical key is in normal while the electronic key is in a service mode.

'Key-n' sets the electronic key to normal or run position.

'Key-s' sets the electronic key to a service position, and likewise 'key-sc' sets it to a secure position.

This command may be executed by a root user (super user in a protected mode).

All three positions—service-normal/run, secure—are available on both the physical key and the electronic key. Physical key 114 overrides the position or transition of the electronic key in secure or service positions of physical key 114, i.e., the electronic key is not active and has no control.

While physical key 114 is in normal/run position, the electronic key is active. The electronic key can be set to a secure position or a service position and its position and transition will override the physical key position. Refer to FIG. 2 for a chart of the various states of system 100 as dependent upon the positions of physical key 114 and the electronic key implemented in EPROM 116. One skilled in the art will be able to implement the logic within this chart within system 100.

Any transition of physical key 114 from a service to a normal mode (or from normal to service and back again from service to normal) will interrupt or break a remote maintenance session by disabling a remote asynchronous line communication. If BUMP 108 is in control (off-line or maintenance session), BUMP 108 will disable the remote connection. If the operating system is active, BUMP 108 will clear register 112 to a normal/run state and interrupt operating system. It is left to a typical maintenance application package or a diagnostics package to properly manage the notification and break the connection. While the operating system is running, BUMP 108 will not break the connection, since the asynchronous line is under control of the operating system.

Any transition(s) of physical key 114 involving a change from service to normal position will deactivate the remote service center session for added security to the customer. Checking of the access rights or authorization and establishing or breaking the connection, while the operating system is up, is left to the maintenance/application package running under the operating system. BUMP 108 manages the off-line session, and notifies the operating system of any physical key transition.

All maintenance, either local or remote, is permitted only in the service position of either the physical or electronic key.

Problem reporting or any equivalent system can be implemented in any service or normal position of the electronic or physical key 114, but remote off-line maintenance generally must be performed only with the physical or electronic key in a service position. The electronic key can be set from a remote service/support session, but the off-line maintenance menus may typically be accessed while the physical or electronic key is in a service position.

On-line maintenance while the operating system is up and running may be possible in any mode or position of either the physical key 114 or the electronic key. For instance, the concurrent diagnostics may be run, as a superuser, while the operating system is up and running, with the key in any position (either service or normal), from a local operating system console or a remote station terminal. (A superuser has unrestricted authority to access and modify any part of the operating system. Usually the superuser is a system administrator. Superuser authority is normally obtained by entering the ▓su command and a password.) The diagnostic session can be entered by typing a "diag" command at the command line.

Any movement of physical key 114 will clear electronic register 112 (or send it to a normal position).

A successful operating system boot will also clear the electronic key status within register 112, unless explicitly confirmed or requested not to do so via a proper entry or a flag set through an off-line maintenance menu. The flag should be set only once (possibly at install time). It will not be reset or cleared by BUMP 108 or the operating system upon subsequent system shutdown, power down, power up, reset or re-IPL processes. Clearing the electronic key status is equivalent to setting it to a normal position.

The position of the electronic key will be preserved over the "reset" or through a subsequent power off/on operation or through a subsequent system shutdown and re-IPL transition phase. BUMP 108 will not alter the electronic key register in NVRAM 110 during normal IPL sequence. But, BUMP 108 will read the electronic key status as well as the physical key status, and take action(s) appropriately.

A successful operating system boot will clear the electronic key register, if so selected or a movement of the physical key 114 will also clear the electronic key status. Similarly, if the remote session is ongoing through the S2 port, any system reset and re-IPL must not break that connection as long as either physical key 114 of the electronic key is in a service position. In other words, BUMP 108 will not disable, reset, break or interrupt the remote session dialog or connection during any phase of the IPL process, if either physical key 114 or the electronic key is in a service position. Likewise, when the operating system comes up and control of the S2 port is handed over to the operating system, it will not break or interrupt the remote session if the key status is to be maintained in the service position.

To summarize, several of the objectives of the electronic key are:

A primary reason/purpose for an electronic key is to be able to place the system in a normal/run secure or service mode from a remote location for security or for maintenance and debug purposes, without a person physically being present at the cite to change the physical key position.

The electronic key should be settable remotely using BUMP resources for off-line maintenance, and also from the operating system. The reasons for electronic key setability in an off-line mode are:

Assume that the operating system is up and running, but the electronic key is not set to a service position. Some software panic situation or hardware problem causes system 100 to hang, or the operating system crashes, and system 100 tries to reboot, but now it fails to boot. The user needs an assistance from the remote service center. The user can set the electronic key, locally, to service via the BUMP interface, while still leaving physical key 114 in a normal position. The user may leave the site or the customer hub or remote service center can set the electronic key to a service position remotely, without having to move physical key 114. The remote service center can now debug system 100 in normal or service mode, and once the problem is corrected, can reset the electronic key to a normal position and let system 100 run. If physical key 114 were moved to a service position and the customer did not want to operate system 100 in a service mode, he would have to physically change the key once system 100 is up and running.

If the electronic key is set to a service mode off-line, system 100 can be IPLed in a service mode, and either diagnostics run or a single user mode (operating system maintenance mode) can be entered. With the electronic key, most of these problems can be fixed remotely without a person being on-site.

The reasons for operating system setability of the electronic key are:

If system 100 is up and running under the operating system, under a normal/run position of the electronic key, setability of the electronic key to a service position is required for the following purposes.

If it is desired to shutdown and re-IPL the machine in a service mode, the operating system should change the key position. BUMP 108 or an off-line maintenance menu may allow setting the key if a problem is detected during IPL, or if an escape sequence to set the electronic key is entered at an appropriate phase during IPL.

The on-line monitor/maintenance menu may only be presented in a service mode.

If system 100 does its own error threshold analysis and wants to send the results or wants to send error log information to a remote service center, this may be possible in a service mode. However, there is no fundamental reason why this may not be performed in a normal/run mode.

If a software, microcode or device driver update/install is desired over the network or remotely, it may be done in a service mode. However, chances are that system 100 would have to be shutdown and re-IPLed in a service mode to perform any install/update.

The electronic key provides an access for remote service capability. However, the electronic key may be configured so that it does not control or establish the accessibility rights of the remote service center. But, once the communication between the target machine and the remote service center is established, the electronic key allows system 100 to be placed in a service or normal mode from a remote site without physical key 114 being moved, and offers a possibility of being able to get to the off-line maintenance menu.

With the foregoing hardware in mind, it is possible to explain the process-related features of the present invention. To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Although the present invention and its advantages have been described in detail, it should be understood that various changes, substitutions and alterations can be made herein without departing from the spirit and scope of the invention as defined by the appended claims.

What is claimed is:

1. A data processing system comprising:
   a processor,
   a memory, wherein the memory includes a physical key memory location for storing a representation of a physical key having three positions corresponding to a normal/run mode, a secure mode, and a service mode and an electronic key memory location for storing a representation of an electronic key having three positions corresponding to said normal/run, secure, and service modes,
   a bus for coupling said processor to said memory,
   providing means for providing a key interface menu to a remote station when the representation of the physical key and representation of the electronic key indicate that the physical key and the electronic key are in said normal/run mode and a failure is encountered during self testing of the data processing system or when the representation of the physical key indicates that the physical key is in said normal/run mode and the representation of the electronic key indicates that the electronic key is in said secure mode and for providing a maintenance menu to the remote station when one of said physical key or said electronic key representations indicate that one of said physical key or said electronic key are in said service mode, and
   setting means for setting the electronic key into said service mode based on information received from the remote station such that the remote station can control and monitor modes of operation of the data processing system.

2. The data processing system as recited in claim 1, wherein the providing means further functions to provide the key interface menu to a local display of the data processing system.

3. The data processing system as recited in claim 2, further comprises a manually operable key as the physical key.

4. The data processing system as recited in claim 2, further comprising means for receiving diagnostic commands from the remote station such that the remote station can invoke diagnostic routines to determine failures within the data processing system.

5. The data processing system as recited in claim 4, wherein the providing means further functions to provide diagnostic data, which is generated in response to the diagnostic routines, to the remote station and the local display.

6. The data processing system as recited in claim 5, further comprising means for terminating the diagnostic routines and resetting the electronic key to the normal/run mode when the physical key is changed from the normal/run mode.

7. In a data processing system, a method comprising the steps of:
   determining a failure during self testing of the data processing system;
   providing a physical key positionable into a normal/run mode, a secure mode, and a service mode;
   providing an electronic key positionable into the normal/run mode, the secure mode, and the service mode;
   providing a key interface menu to a remote station when the failure is determined and when the physical key and the electronic key are both in the normal/run mode or when the physical key is in the normal/run mode and the electronic key is in the secure mode;
   providing a maintenance menu when one of the physical and electronic keys are in the service mode;
   setting the electronic key to the service mode based on information received from the remote station;
   executing a diagnostic routine based on prompting from the remote station when the electronic key is in the service mode.

8. The method as recited in claim 7, further comprising the step of terminating the diagnostic routine and resetting the electronic key to the normal/run mode when the physical key is changed from the normal/run mode.

9. The method as recited in claim 7, further comprising the step of switching the electronic key to a secure mode such that the data processing system in placed in a secure mode.

10. The data processing system as recited in claim 1 wherein said maintenance menu includes means for diagnosing the source of a failure within the data processing system.

11. The data processing system as recited in claim 10 wherein said key interface menu includes means for changing the position of said electronic key.

* * * * *